(12) United States Patent
Carlström (10) Patent No.: US 8,997,105 B2
(45) Date of Patent: *Mar. 31, 2015

(54) METHOD FOR PACKET FLOW CONTROL USING CREDIT PARAMETERS WITH A PLURALITY OF LIMITS

(71) Applicant: Marvell International Ltd., Hamilton (BM)

(72) Inventor: Jakob Carlström, Uppsala (SE)

(73) Assignee: Marvell International Ltd., Hamilton (BM)

( * ) Notice: Subject to any disclaimer, the term of this patent is extended or adjusted under 35 U.S.C. 154(b) by 3 days.

This patent is subject to a terminal disclaimer.

(21) Appl. No.: 13/960,954

(22) Filed: Aug. 7, 2013

(65) Prior Publication Data

US 2013/0326530 A1 Dec. 5, 2013

Related U.S. Application Data

(63) Continuation of application No. 13/457,001, filed on Apr. 26, 2012, now Pat. No. 8,522,246, which is a continuation of application No. 12/306,029, filed as application No. PCT/EP2007/055777 on Jun. 12, 2007, now Pat. No. 8,171,478.

(60) Provisional application No. 60/817,095, filed on Jun. 29, 2006.

(30) Foreign Application Priority Data

Jun. 22, 2006 (SE) ...................................... 0601389

(51) Int. Cl.
*G06F 9/455* (2006.01)
*G06F 9/46* (2006.01)
(Continued)

(52) U.S. Cl.
CPC .............. *G06F 9/4881* (2013.01); *H04L 47/10* (2013.01); *H04L 47/215* (2013.01)
USPC .......................................................... 718/103

(58) Field of Classification Search
None
See application file for complete search history.

(56) References Cited

U.S. PATENT DOCUMENTS 6,757,249 B1 6/2004 Kejriwal et al.
6,950,395 B1 9/2005 Bashandy et al.
(Continued)

FOREIGN PATENT DOCUMENTS

DE 10 2004 024 407 A1 12/2004
TW 200408226 A 5/2004
(Continued)

OTHER PUBLICATIONS

May 28, 2013 Office Action issued in Taiwanese Patent Application No. 096122167 (with translation).

*Primary Examiner* — Corey S Faherty (57) ABSTRACT

The present invention relates to a processor and a method for processing a data packet, the method including steps of decreasing a value of a first credit parameter when the data packet is admitted to a processor at least partly based on the value of the first credit parameter and a first limit of the first credit parameter, and increasing the value of the first credit parameter, in dependence on a data storage level in a buffer in which the data packet is stored before being admitted to the processor, the value of the first credit parameter not being increased, so as to become larger than a second limit of the first credit parameter, when the buffer is empty.

20 Claims, 4 Drawing Sheets

(51) Int. Cl.
*G06F 9/48* (2006.01)
*H04L 12/801* (2013.01)
*H04L 12/819* (2013.01)

(56) References Cited

U.S. PATENT DOCUMENTS 6,970,426 B1 11/2005 Haddock
6,992,984 B1 1/2006 Gu
7,068,606 B1 6/2006 Ma et al.
7,536,473 B2 5/2009 Ajanovic et al.
2003/0231648 A1 12/2003 Tang

FOREIGN PATENT DOCUMENTS

METHOD FOR PACKET FLOW CONTROL USING CREDIT PARAMETERS WITH A PLURALITY OF LIMITS

CROSS-REFERENCE TO RELATED APPLICATIONS

This is a continuation of U.S. patent application Ser. No. 13/457,001, filed on Apr. 26, 2012, now issued as U.S. Pat. No. 8,522,246, which is a continuation of U.S. patent application Ser. No. 12/306,029, filed on Dec. 22, 2008, now issued as U.S. Pat. No. 8,171,478, which claims priority under 35 U.S.C. §371 to International Application No. PCT/EP2007/055777, which claims priority to Swedish Patent Application No. 0601389-0, filed on Jun. 22, 2006, and U.S. Provisional Patent Application No. 60/817,095, filed on Jun. 29, 2006, the disclosures of each of which are hereby incorporated by reference as if fully stated herein.

TECHNICAL FIELD

The present invention relates to a processor and a method for a processor comprising processing means, the method comprising the steps of admitting a data packet to the processing means based at least partly on a value of a first credit parameter and a first limit of the first credit parameter, and decreasing the value of the first credit parameter if the data packet is admitted to the processing means.

BACKGROUND

In data processing, it is desired to reduce buffer capacity, i.e. storage capacity provided for storing data during queuing.

In some known processors, incoming data traffic is admitted as quickly as possible without controlled admittance limitation, whereby limitations are given by processing capabilities. This will result in large requirements on buffer capacities in the processor. Also, data shaping can be used so that incoming data traffic is admitted to the processing element(s) of the processor so as to accomplish a constant bit rate, and/or a constant packet rate.

In a processor, a shaper might be used for controlling incoming traffic based on a first resource of the processor, for example the bit rate capacity, and another shaper might be used to control incoming traffic based on a second resource of the processor, for example the data packet rate capacity. Such shapers usually have some credit parameter, for example in the form of a token bucket, based on which packets are admitted to the processing element(s) of the processor. The credit values are increased periodically with predetermined amounts, data packets are not admitted unless credit values of the shapers have reached a limit value, and the credit values are decreased when data packets are admitted. In such a processor, bursts might occur in the processor reasons illustrated by the following example: After a sequence of packets consuming a relatively large amount of the first resource and a relatively small amount of the second resource, e.g. relatively long data packets, the credit value of one of the shapers will reach a relatively high level. If such a packet sequence consuming a lot of the first resource and little of the second resource is followed by a sequence of packets consuming a relatively small amount of the first resource, e.g. relatively short data packets, a burst of packets will be permitted until the credit value having reached a relatively high level falls below the limit for admittance of packets. The risk of such data bursts will require a large buffer capacity downstream of the shapers.

SUMMARY

It is an object of the invention to reduce buffer capacity in a processor.

This object is reached with a method of the type mentioned initially, comprising the step of increasing the value of the first credit parameter, in dependence on a value of a second credit parameter, based on which a data packet is admitted to the processing means.

As described closer below, the data packet, the admission of which is based on the value of the second credit parameter, can be identical or not identical with the data packet, the admission of which is based on the value of the first credit parameter.

The invention is especially advantageous where the value of the first credit parameter is compared to a first limit of the first credit parameter, the data packet not being admitted to the processing means if the value of the first credit parameter is lower than the first limit. The invention will make it possible to compare the value of the first credit parameter to a second limit of the first credit parameter, the value of the first credit parameter not being increased, so as to become larger that the second limit of the first credit parameter, if the value of the second credit parameter is below a first limit of the second credit parameter.

In particular, none of the credit values are allowed to increase while any of the other credit values are below a predetermined limit. This will avoid a build-up of large credit values, and will significantly reduce burst sizes, which in turn will allow lower downstream buffer capacity requirements.

The first limit and the second limit of the first credit parameter can be different or equal.

Preferably, the step of increasing the value of the first credit parameter is based at least partly on a first resource or a second resource of the processing means. Thereby, the credit levels, and therefore data admittance is adapted to chosen resources of the processing means, which will reduce buffer capacity requirements of the latter. As explained further below, the processing means resources can be any of a large amount of different types of features of the processing means. For example, one or more of the resources can be performance parameters relating to the processing means, e.g. the first resource can be a bit rate capacity of the processing means, and the second resource can be a data packet rate capacity of the processing means. Alternatively, one or more of the resources can be processing elements, adapted to process data. Alternatively or in addition, the step of increasing the value of the first credit parameter and/or the value of the second credit parameter, and/or decreasing the values of the first and the second credit parameter if the data packet is admitted to the processing means, can be based at least partly on an expected time period of residence in the processing means in the form of a processing pipeline, as described in the International patent application No. PCT/SE2005/001969, filed by the applicant, and incorporated herein by reference.

Herein, the term "credit parameter" implies a parameter, the value of which is adjusted based on the admission of data packets. Thus, also the value of the second credit parameter is decreased if the data packet is admitted to the processing means.

The object of the invention is also reached with a method of the type mentioned initially, comprising the step of increasing the value of the first credit, parameter, in dependence on a data storage level in a buffer in which the data packet is stored before admitted to the processing means. This prevent a build-up of a large credit at a processor data input interface not receiving traffic, or receiving a relatively small flow of traffic, for a period time, so that data burst from such an interface can be avoided when such a time period has passed. Preferably, the value of the first credit parameter is not increased, so as to become larger that a second limit of the first credit parameter, if the buffer is empty.

The object of the invention is also reached with a processor according to any of the claims.

DESCRIPTION OF THE FIGURES

Below, the invention will be described in the detailed description with reference to the drawings, in which.

DETAILED DESCRIPTION

Figure 1:
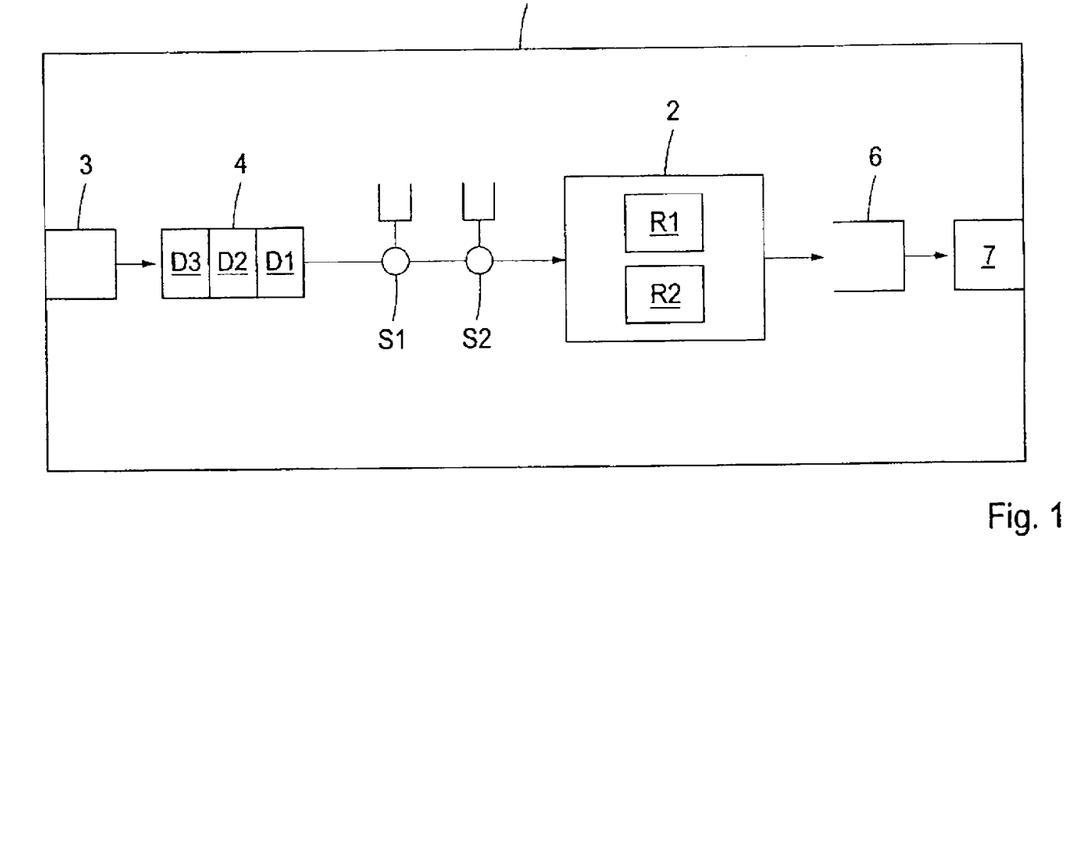
FIG. 1 is a block diagram corresponding to a processor according to one embodiment of the present invention.

FIG. 1 illustrates one embodiment of the present invention. A network processor 1 comprises processing means 2. Two features of the processing means 2 are in this presentation referred to as a first and a second resource R1, R2. A resource as understood in this presentation can be any of a large amount of different types of features, and a few examples are given herein. In addition, in general, the processing means can present more than two resources, see below with reference to FIG. 3. One or more of the resources R1, R2 can be processing elements, adapted to process data. Alternatively, one or more of the resources R1, R2 can be performance parameters related to the processing means 2. In this embodiment of the invention, both performance parameters are performance parameters. More specifically, the first resource R1 is the bit rate capacity of the processing means 2, and the second resource R2 is the packet rate capacity of the processing means 2.

The processing means 2 can be any of a variety of known types, including an asynchronous processing pipeline, as described in said International patent application No. PCT/SE2005/001969, incorporated herein by reference. Thereby, any or all of the resources R1, R2 can be performance parameters related to the processing means 2, or processing elements of the processing pipeline, the amount of which can be considerably larger than two. Any of such processing elements can be an access point for access to a processing device, or engine, as describes in WO2004/010288, included herein by reference.

Alternatively, the processing means 2 can be a RISC (Reduced Instruction Set Computer) processor, microcoded engine, hardcoded engine, or a combination of multiple processing means of one type or many types.

Data traffic is forwarded from left to right in FIG. 1. Data packets D1, D2, D3 enter the processor through a data input interface comprising an input port 3, and are stored in an input buffer 4 before admitted to the processing means 2 in a manner described below. After exiting the processing means 2, the packets are stored in an output buffer 6 before being transmitted through an output port 7.

Admission to the processing means 2 is determined by a first and a second shaper S1, S2, in the form of a bit rate shaper S1 and a packet rate shaper S2, respectively. The bit rate shaper S1 limits the bit rate to the processing means 2. The limitation property of the bit rate shaper S1 is chosen based on the first resource R1, i.e. the bit rate capacity of the processing means 2. The packet rate shaper S2 limits the flow of data packets to the processing means 2. The limitation property of the packet rate shaper S2 is chosen based on the second resource R2, i.e. the packet rate capacity of the processing means 2.

The shapers S1, S2 can be provided in any suitable form, for example as a software program, or part thereof, or as digital or analogue circuits of electrical, optical or mechanical components.

Figure 2:
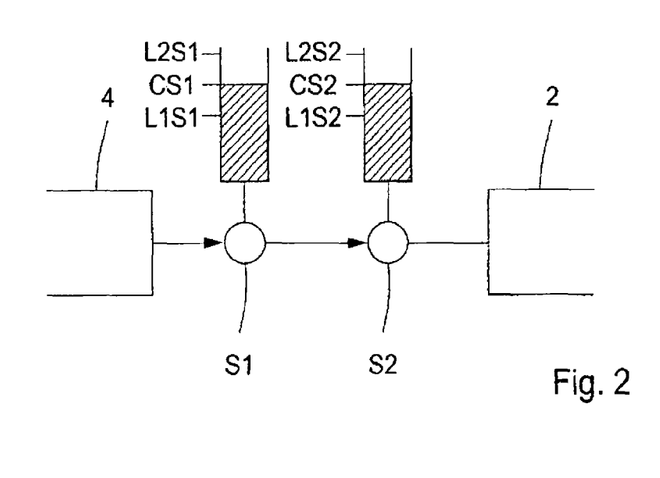
FIG. 2 is a block diagram corresponding to a part of the processor to which the diagram in FIG. 1 corresponds.

Reference is made to FIG. 2. Both shapers S1, S2 use token bucket algorithms, so that admittance of data is based on a respective value CS1, CS2 of a credit parameter. Each of these values CS1, CS2, herein also referred to as credit values CS1, CS2, are compared to a respective first limit L1S2, L1S2. If any of the credit values CS1, CS2 is below the respective first limit L1S2, L1S2, no data traffic is allowed to pass the respective shaper.

If neither of the credit values CS1, CS2 is below the respective first limits L1S2, L1S2 in the token buckets of the shapers S1, S2, the next packet D1 in turn in the input buffer 4 is admitted to the processing means 2. When the packet D1 is admitted to the processing means, the credit value CS1 of the bit rate shaper S1 is reduced by an amount corresponding amount of bits of the packet D1, and the credit value CS2 of the packet rate shaper S2 is reduced by an amount corresponding to the number of packets admitted, i.e. one packet.

As an alternative, the credit value CS2 of the packet rate shaper S2 can be adjusted as described in said International patent application No. PCT/SE2005/001969, incorporated herein by reference. Accordingly, each data packet D1, D2, D3 can comprise a header with information, and the packet rate shaper S2 can be adapted to read the information, which can be related to the cost of the data packet, i.e. to the longest time that the respective data packet D1, D2, D3 keeps any processing element of the processing means 2 busy from accepting new data packets. Alternatively or in addition, such header information can be used to establish the identity of the resource, i.e. the processing element, to be engaged in processing of the respective packet D1, D2, D3. Further, the header can also include information about the size of the respective data packet. When the packet is admitted to the processing means, the credit value CS2 of the packet rate shaper S2 is reduced by an amount corresponding to the header information, e.g. cost information.

A second limit L2S1, L2S2 of the respective shaper S1, S2 is higher than the respective first limit L1S2, L1S2, as indicated in FIG. 2. Alternatively the second limit L2S1, L2S2 of the respective shaper S1, S2 can be identical with the respective first limit L1S2, L1S2. If the credit value CS1 of the bit rate shaper S1 is below the second limit L2S1, the credit value CS1 is periodically, e.g. every clock cycle of the processor 1, incremented by a fixed credit amount. The value of the fixed credit amount is based on the frequency of the periodic increments (e.g. every clock cycle) and the first resource R1, i.e. the bit rate capacity of the processing means 2. Similarly, if the credit value of the packet rate shaper S2 is below the second limit L2S2, the credit value CS2 is periodically incremented by a fixed credit amount, which is based on the frequency of the periodic increments and the second resource R2, i.e. the packet rate capacity of the processing means 2.

Preferably, the shapers S1, S2 use a so called loose token bucket algorithm, i.e. the first limits L1S1, L1S2 are zero, and when the both credit values CS1, CS2 are non-negative, the next packet D1 in turn in the input buffer 4 is admitted to the processing means 2.

If the credit value of any of the shapers S1, S2 is below the first limit L1S2, L1S2, the credit value of the other shaper S1, S2 is not incremented above a respective second limit L2S1, L2S2. Limiting the credit value of any of the shapers S1, S2 to the respective second limit L2S1, L2S2, if the credit value of any other of the shapers S1, S2 is below the first limit L1S2, L1S2, will reduce buffer capacity requirements of the processing means 2. This is explained by the following example:

Independent shapers, allowing unlimited increase of credit levels regardless of credit levels in other shapers, can not prevent the situations described as follows: After a sequence of packets consuming a relatively large amount of the first resource R1 and a relatively small amount of the second resource R2, i.e. in this example relatively long data packets, the credit value of the second shaper S2 will reach a relatively high level. If such a packet sequence consuming a lot of the first resource R1 and little of the second resource R2 is followed by a sequence of packets consuming a relatively small amount of the first resource R1, i.e. in this example relatively short data packets, a burst of packets will be permitted until credit value CS2 of the second shaper S2 falls below the first limit L1S2. Correspondingly, after a sequence of packets consuming a lot of the second resource R2 and a only a little of the first resource R1, i.e. in this example relatively short data packets, the credit, value of the first shaper S1 will reach a high level, allowing a burst of a following sequence of packets consuming a relatively small amount of the second resource R2, i.e. in this example relatively short data packets, until credit value CS1 of the first shaper S1 fails below the first limit L1S1.

The invention will prevent a build-up of large credit values during data sequences consuming a large amount of one resource in relation to another resource of the processor. This will significantly reduce burst sizes, which in turn will allow lower downstream buffer capacity requirements. In the case of the processing means 2 being an asynchronous processing pipeline, as described in said International patent application No. PCT/SE2005/001969, the invention will reduce requirements on processing element buffers, in the form of a FIFO buffers, provided before the processing elements.

As mentioned, the shapers S1, S2 preferably use a loose token bucket algorithm, but alternatively, any other suitable admittance algorithm can be used. In case a so called strict token bucket algorithm is used, the first limits L1S1, L1S2 can be positive, and the packet D1 is admitted to the processing means 2 when the credit values CS1, CS2 are at least as large so as to correspond to the respective first limits L1S1, L1S2.

Where a strict token bucket algorithm is used, the first limit L1S1, L1S2 of any or all of the shapers can be predetermined and identical for all data packets passing the respective shaper S1, S2. Alternatively, the first limit L1S1, L1S2 can be individual for each packet, in which case the respective shaper S1, S2 is adapted to read, before admittance, header information (e.g. of the type described above) of each data packet D1, D2, D3, and set the first limit L1S1, L1S2 based on the header information. For example, the header information of the respective data packet D1, D2, D3 could include a cost C1, C2, C3, corresponding to a first limit value L1S1, L1S2 of one of the shapers, S1, S2. Thus, from the header information of the first packet D1 in the input buffer 4, the cost C1 is read, and the first limit value L1S1, L1S2 is determined as L1S1 (or L1S2)=C1.

Further, where a strict token bucket algorithm is used, the second limit L2S1, L2S2, (above which the credit value of the respective shaper S1, S2 is not incremented if the credit value of the other shaper S1, S2 is below its first limit L1S2, L1S2), can either be identical with or higher than the first limit. L1S2, L1S2. In the latter case, the second limit L2S1, L2S2 can be set individually for each packet to a value exceeding the first limit L1S1, L1S2 by a predetermined amount.

Figure 3:
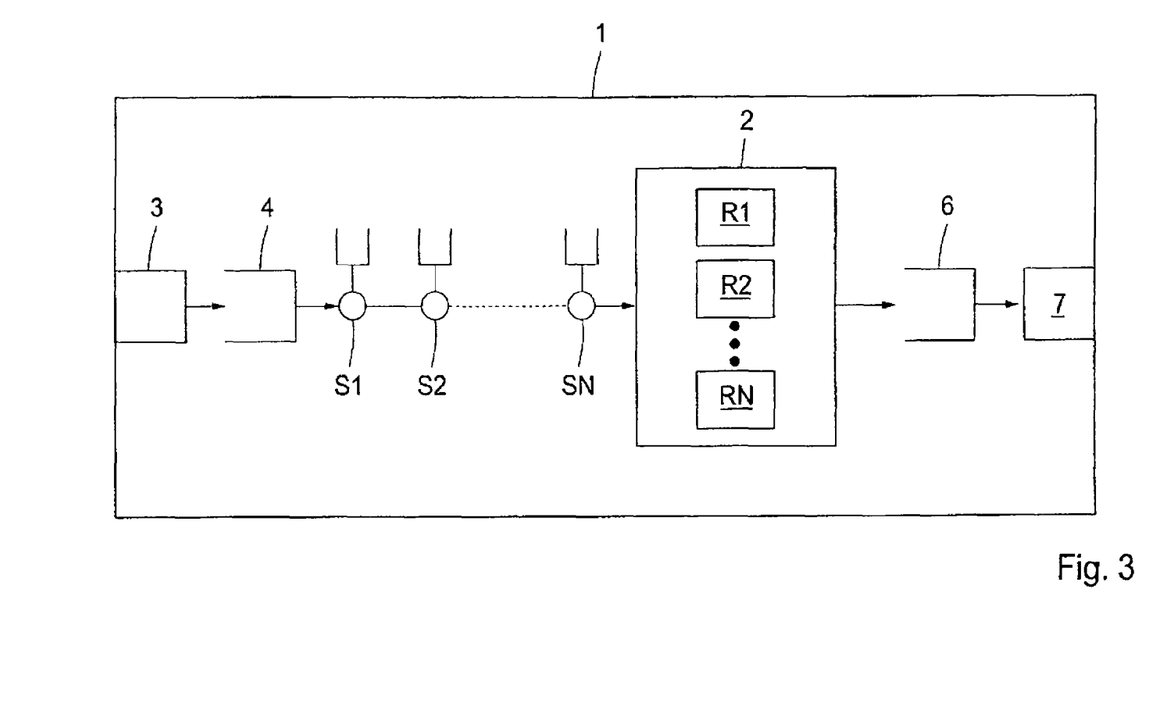
FIG. 3 is a block diagram corresponding to a processor according to another embodiment of the present invention.

FIG. 3 illustrates a further embodiment of the present invention. The processing means 2 presents more than two features in the form of resources R1, R2 . . . RN, which each can be any of a large amount of different types of features. For example, a first and a second resource R1, R2 can be the bit rate capacity and the packet rate capacity, respectively, of the processing means 2, and further resources can be processing elements, adapted to process data.

Admission to the processing means 2 is determined by shapers S1, S2 . . . SN, the amount of which is the same as the amount of processor means resources R1, R2 . . . RN. The limitation property of the first shaper S1 is chosen based on the first resource R1, and the limitation property of the second shaper S2 is chosen based on the second resource R2, etc.

Preferably, each shaper S1, S2 . . . SN uses a token bucket algorithm, so that admittance of data is based on a respective value CS1, CS2 . . . CSN of a credit parameter. If a credit value CS1, CS2 . . . CSN is below a first limit L1S2, L1S2 . . . L1SN, no data traffic is allowed to pass the respective shaper. Admittance of data traffic is carried out in a manner corresponding to what has been described above with reference to FIGS. 1 and 2. Thus, if the credit value CS1, CS2 . . . CSN of any of the shapers S1, S2 . . . SN is below the respective first limit L1S2, L1S2 . . . L1SN, the respective credit value CS1, CS2 . . . CSN is periodically, e.g. every clock cycle of the processor 1, incremented by a respective fixed credit amount. The value of the respective fixed credit amount is based on the frequency of the periodic increments (e.g. every clock cycle) and the respective resource R1, R2 . . . RN.

If the credit value of any of the shapers S1, S2 . . . SN is below the respective first limit L1S2, L1S2 . . . L1SN, the credit value of the other shapers S1, S2 . . . SN is not incremented above a respective second limit L2S1, L2S2 . . . L2SN. The second limit L2S1, L2S2 . . . L2SN can be above or identical with the respective first limit L1S2, L1S2 . . . L1SN.

In the embodiments described with reference to FIG. 1-3, the data packet D1, D2, D3, the admission of which is based on the value CS2 of the second credit parameter, is identical with the data packet, the admission of which is based on the value CS1 of the first credit parameter. However, as exemplified below with reference to FIG. 4, the invention is also adaptable so that admittance of a first data packet to the processing means 2 is based on a value of a first credit parameter, the value of the first credit parameter being increased in dependence on a value of a second credit parameter, based on which a second data packet is admitted to the processing means, the second data packet not being identical with the first data packet. In the example in FIG. 4, the first and second data packets enter the processor through separate interfaces.

Figure 4:
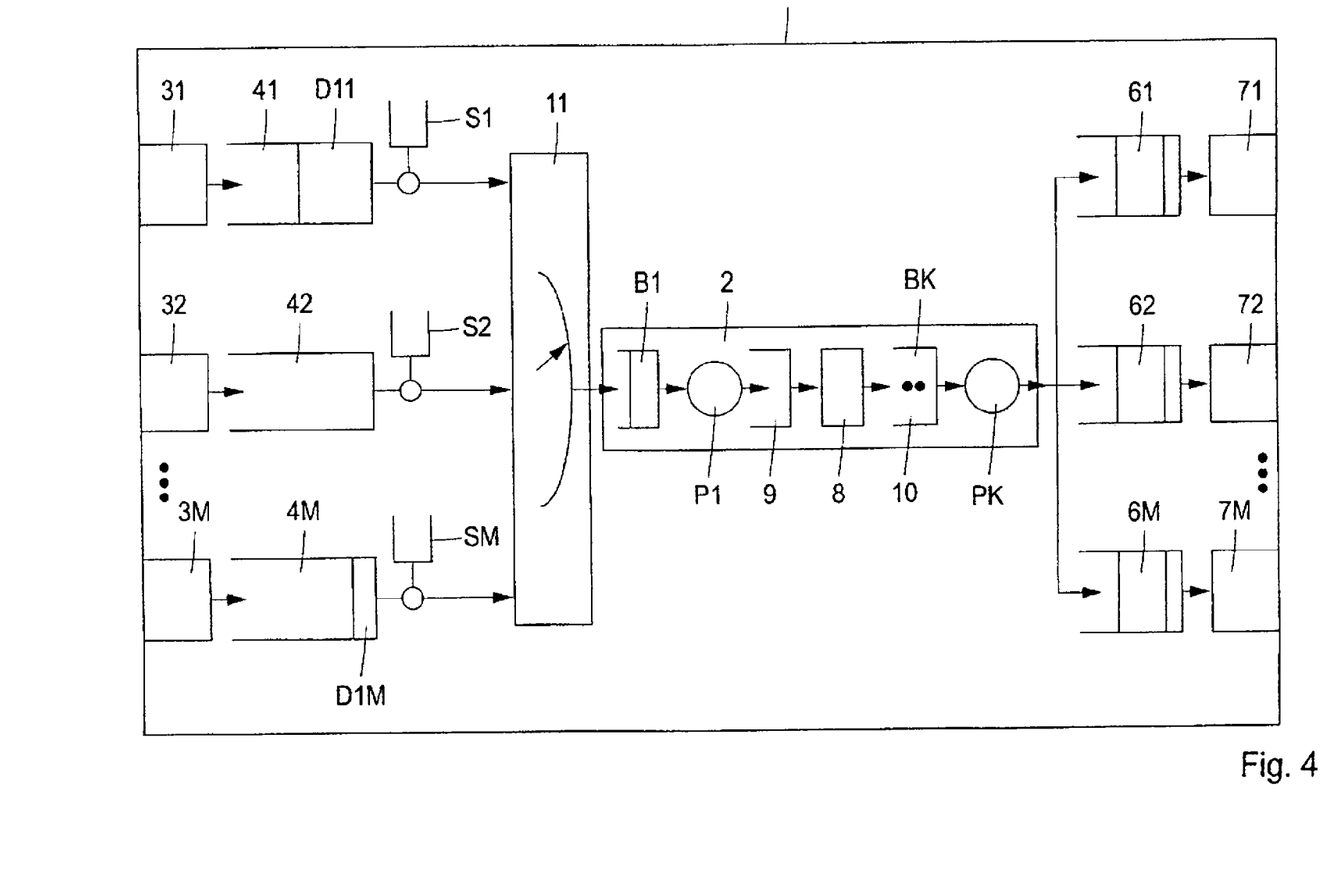
FIG. 4 is a block diagram corresponding to a processor according to a further embodiment of the present invention.

Referring to FIG. 4, a further embodiment of the invention is illustrated. A network processor 1 comprises processing means 2 in the form of an asynchronous processing pipeline 2, as described closer in said International patent application No. PCT/SE2005/001969, included herein by reference, including asynchronous processing elements P1, . . . PK and a synchronous element 8, with elastic buffering 9, 10. As in the case of the embodiment described with reference to FIGS. 1 and 2, the processing means 2 can alternatively be provided in another form, for example as provided in a RISC-processor.

As described closer in said International patent application No. PCT/SE2005/001969, included herein by reference, data packets D11, . . . D1M enter the processor through interfaces each comprising an input port 31, 32, . . . 3M, and are stored in respective input buffers 41, 42, 4M, in addition to which a pipeline arbiter 11, S1, S2, . . . SM comprises a scheduler 11 and a plurality of shapers S1, S2, . . . SM. In particular, for each pair of input port 31, 32, . . . 3M and input buffer 41, 42, . . . 4M, a shaper S1, S2, . . . SM is provided. Admission to the pipeline 2 is determined by the shapers S1, S2, . . . SM and the scheduler 11, which operates according to a Round Robin algorithm, access to the pipeline being given to the shapers S1, S2, . . . SM in a continuous sequence of pollings by the scheduler 11.

Besides the Round Robin algorithm, alternative scheduling disciplines could be used, for example weighted fair queuing, deficit round robin, deficit weighted round robin, strict priority queuing, earliest deadline first, and first-come first-serve.

Preferably, each shaper S1, S2 . . . SM uses a token bucket algorithm, so that admittance of data is based on a respective value CS1, CS2 . . . CSM of a credit parameter. If a credit value CS1, CS2 . . . CSM is below a first limit L1S2, L1S2 . . . L1SM, no data traffic is allowed to pass the respective shaper. If the credit value CS1, CS2 . . . CSM of any of the shapers S1, S2 . . . SM is below the respective first limit L1S2, L1S2 . . . L1SM, the respective credit value CS1, CS2 . . . CSM is periodically, e.g. every clock cycle of the processor 1, incremented by a respective fixed credit amount. The value of the respective fixed credit amount is based on a resource of the processing means 2, for example the packet rate capacity thereof, the frequency of the periodic increments (e.g. every clock cycle) and the amount of input ports 31, 32, . . . 3M. The resource of the processing means 2, on which the fixed credit amount increments of the shapers S1, S2 . . . SM are based, can alternatively be the bit rate capacity of the processing means 2, or any other performance parameter thereof. As a further alternative, the fixed credit amount increments of different shapers S1, S2 . . . SM can be based on different processing elements P, . . . PK, 8 to which traffic from the respective shaper is addressed.

If the credit value of any of the shapers S1, S2 . . . SM is below the respective first limit L1S2, L1S2 . . . L1SN, the credit value of the other shapers S1, S2 . . . SM is not incremented above a respective second limit L2S1, L2S2 . . . L2SM. The second limit L2S1, L2S2 . . . L2SM can be above or identical with the respective first limit L1S2, L1S2, . . . L1SM. This prevents a build-up of a large credit in a shaper at an interface not receiving traffic, or receiving a relatively small flow of traffic for a period time, so that data burst from such an interface can be avoided when such a time period has passed. (It should be noted that in this presentation, a shaper being provided at an interface or an input port, indicates that it is either physically provided by, or functionally connected to the interface or the input port.)

Still referring to FIG. 4, it should be mentioned that at each of the interfaces or input ports 31, 32, . . . 3M a plurality of shapers can be provided as described above with reference to FIG. 1-3, the credit of the shapers at each interface being respectively adjusted based on respective resources of the processing means. Thus, if the credit value of any of the shapers is below the respective first limit, the credit value of the other shapers at the same interface is not incremented above a respective second limit. Alternatively, if the credit value of any of the shapers is below the respective first limit, the credit value of all other shapers, including the ones at other interfaces, is not incremented above a respective second limit.

Alternatively or in addition, any of the embodiments described above with reference to FIG. 1-4 can be adjusted so that if any of the input buffers 4, 41, 42, . . . 4M is empty, the credit value of the shaper (or shapers), adapted to receive traffic from this input buffer 4, 41, 42, . . . 4M, is not incremented above the second limit L2S1, L2S2 . . . L2SM. This prevent a build-up of a large credit in a shaper at an interface not receiving traffic, or receiving a relatively small flow of traffic for a period time, so that data burst, from such an interface can be avoided when such a time period has passed.

What is claimed is:

1. A method for processing a data packet, the method comprising:
   decreasing a value of a first credit parameter when the data packet is admitted to a processor at least partly based on the value of the first credit parameter; and
   increasing the value of the first credit parameter, in dependence on a data storage level in a buffer in which the data packet is stored before being admitted to the processor, the value of the first credit parameter not being increased, so as to become larger than a limit of the first credit parameter, when the buffer is empty.

2. A method according to claim 1, wherein the limit is a second limit of the first credit parameter, the method further comprising:
   decreasing the value of the first credit parameter at least partly based on the value of the first credit parameter and a first limit of the first credit parameter.

3. A method according to claim 2, further comprising:
   maintaining the second limit of the first credit parameter higher than the first limit of the first credit parameter.

4. A method according to claim 2, wherein the first limit is zero.

5. A method according to claim 1, further comprising:
   increasing the value of the first credit parameter at least partly based on a first resource or a second resource of the processor.

6. A method according to claim 5, further comprising:
   decreasing a value of a second credit parameter associated with the second resource of the processor when the data packet is admitted to the processor.

7. A method according to claim 5, further comprising:
   increasing the value of the first credit parameter at least partly based on the first resource that is a bit rate capacity of the processor or the second resource that is a data packet rate capacity of the processor.

8. A processor comprising:
   a first resource associated with a first credit parameter; and
   a second resource associated with a second credit parameter, the processor being configured to:
      decrease a value of the first credit parameter when a data packet is admitted to the processor at least partly based on the value of the first credit parameter;
      increase the value of the first credit parameter, in dependence on a value of the second credit parameter, the data packet being admitted to the processor based on the second credit parameter; and
      compare the value of the first credit parameter to a limit of the first credit parameter, and not increase the value of the first credit parameter, so as to become larger that than the limit of the first credit parameter when a value of the second credit parameter is below a limit of the second credit parameter.

9. The processor according to claim 8, wherein the limit is a second limit of the first credit parameter, the processor is further configured to decrease the value of the first credit parameter when the data packet is admitted to the processor at least partly based on the value of the first credit parameter and a first limit of the first credit parameter.

10. The processor according to claim 9, wherein the processor is further configured to maintain the second limit of the first credit parameter higher than the first limit of the first credit parameter.

11. The processor according to claim 9, wherein the first limit is zero.

12. The processor according to claim 8, wherein the value of the first credit parameter is increased at least partly based on the first resource or the second resource.

13. The processor according to claim 8, wherein the first resource is a bit rate capacity of the processor, and the second resource is a data packet rate capacity of the processor.

14. The processor according to claim 8, wherein the value of the second credit parameter is decreased when the data packet is admitted to the processor.

15. A processor system comprising a processor, the processor configured to:
   decrease a value of a first credit parameter when a data packet is admitted to the processor at least partly based on the value of the first credit parameter; and
   increase the value of the first credit parameter, in dependence on a data storage level in a buffer configured to store the data packet before being admitted to the processor, the processor further configured to not increase the value of the first credit parameter, so as to become larger than a limit of the first credit parameter, when the buffer is empty.

16. The processor system according to claim 15, wherein the limit is a second limit of the first credit parameter, the processor is further configured to decrease the value of the first credit parameter when the data packet is admitted to the processor at least partly based on the value of the first credit parameter and a first limit of the first credit parameter.

17. The processor system according to claim 16, wherein the second limit of the first credit parameter is higher than the first limit of the first credit parameter.

18. The processor system according to claim 16, wherein the first limit is zero.

19. The processor system according to claim 15, wherein the value of the first credit parameter is increased at least partly based on a first resource or a second resource of the processor.

20. The processor system according to claim 19, wherein a value of a second credit parameter associated with the second resource of the processor is decreased when the data packet is admitted to the processor.

* * * * *